(12) United States Patent
Cheng

(10) Patent No.: US 12,461,347 B2
(45) Date of Patent: Nov. 4, 2025

(54) WIDE-ANGLE OPTICAL LENS SYSTEM

(71) Applicant: Himax Technologies Limited, Tainan (TW)

(72) Inventor: Yu-Ching Cheng, Tainan (TW)

(73) Assignee: Himax Technologies Limited, Tainan (TW)

( * ) Notice: Subject to any disclaimer, the term of this patent is extended or adjusted under 35 U.S.C. 154(b) by 435 days.

(21) Appl. No.: 18/073,454

(22) Filed: Dec. 1, 2022

(65) Prior Publication Data

US 2024/0184085 A1 Jun. 6, 2024

(51) Int. Cl.
*G02B 13/06* (2006.01)
*G02B 13/00* (2006.01)
*G02B 9/60* (2006.01)

(52) U.S. Cl.
CPC ......... *G02B 13/06* (2013.01); *G02B 13/0045* (2013.01); *G02B 9/60* (2013.01); *G02B 13/0085* (2013.01)

(58) Field of Classification Search
USPC .......................................................... 359/763
See application file for complete search history.

(56) References Cited

U.S. PATENT DOCUMENTS

| | | | | |
|---|---|---|---|---|
| 8,000,037 B2* | 8/2011 | Hirao | ................... | G02B 13/006 |
| | | | | 359/716 |
| 8,922,913 B2* | 12/2014 | Yin | ..................... | G02B 13/0045 |
| | | | | 359/784 |
| 9,835,821 B1* | 12/2017 | Yin | ..................... | G02B 13/0045 |
| 2022/0221687 A1* | 7/2022 | Ito | ....................... | G02B 13/0085 |

* cited by examiner

*Primary Examiner* — Dung T Nguyen
(74) *Attorney, Agent, or Firm* — Donald E. Stout; Stout, Uxa & Buyan, LLP

(57) ABSTRACT

A wide-angle optical lens system includes a negative-powered first lens group, a positive-powered second lens group and a positive-powered third lens group arranged in an order from an object side to an image side.

15 Claims, 8 Drawing Sheets

| Surface | Type | Radius (mm) | Thickness (mm) | Reflective index | Conic |
|---|---|---|---|---|---|
| object | | infinity | 23 | air | 0.000 |
| s1 | | infinity | 0.200 | 1.503 | 0.000 |
| s2 | | infinity | 0.020 | 1.7 | 0.000 |
| s3 | aspheric | 0.323 | 0.344 | air | -1.612 |
| s4 | aspheric | 0.357 | 0.201 | 1.7 | -1.130 |
| s5 | | infinity | 0.200 | 1.503 | 0.000 |
| s6 | | infinity | 0.167 | 1.7 | 0.000 |
| s7 | aspheric | -0.569 | 0.052 | air | 5.147 |
| s8 | aspheric | -0.454 | 0.020 | 1.7 | 2.084 |
| s9 | | Infinity | 0.200 | 1.503 | 0.000 |
| s10 | | Infinity | 0.255 | 1.7 | 0.000 |
| s11 | aspheric | -0.555 | 0.015 | air | -0.519 |
| s12 | | infinity | 0.500 | 1.503 | 0.000 |
| s13 | | infinity | 0.025 | air | 0.000 |
| image plane | | infinity | | | 0.000 |

FIG. 1C

| Aspheric coefficients | | | | | | | |
|---|---|---|---|---|---|---|---|
| | 4th order | 6th order | 8th order | 10th order | 12th order | 14th order | 16th order |
| s3 | 3.94E-01 | -3.74E+00 | 2.48E+01 | -2.41E+00 | -6.42E+02 | 1.55E+03 | 1.53E+03 |
| s4 | 4.02E-01 | 2.45E+00 | -1.98E+02 | -4.52E+02 | 4.24E+04 | -3.48E+05 | 1.16E+05 |
| s7 | 2.95E+00 | 5.79E+01 | -3.80E+03 | 4.69E+04 | 2.55E+06 | -6.43E+07 | 2.99E+08 |
| s8 | -3.37E-01 | -1.09E+02 | -4.29E+03 | 9.57E+04 | 3.31E+06 | -1.59E+08 | 9.80E+08 |
| s11 | 8.37E-01 | 7.44E+00 | -6.18E+01 | 1.03E+02 | -3.65E+02 | 2.67E+03 | -5.45E+03 |

FIG. 1D

| Surface | Type | Radius (mm) | Thickness (mm) | Reflective index | Conic |
|---|---|---|---|---|---|
| object | | infinity | 23 | air | 0.000 |
| s1 | | infinity | 0.240 | 1.503 | 0.000 |
| s2 | | infinity | 0.020 | 1.596 | 0.000 |
| s3 | aspheric | 0.228 | 0.221 | air | -0.679 |
| s4 | aspheric | 0.337 | 0.225 | 1.596 | -0.217 |
| s5 | | infinity | 0.200 | 1.503 | 0.000 |
| s6 | | infinity | 0.082 | 1.596 | 0.000 |
| s7 | aspheric | -1.417 | 0.107 | air | 37.299 |
| s8 | aspheric | 1.761 | 0.087 | 1.596 | -39.997 |
| s9 | | infinity | 0.200 | 1.503 | 0.000 |
| s10 | | infinity | 0.136 | 1.596 | 0.000 |
| s11 | aspheric | -0.714 | 0.147 | air | -10.011 |
| s12 | | infinity | 0.500 | 1.503 | 0.000 |
| s13 | | infinity | 0.025 | air | 0.000 |
| image plane | | infinity | | | 0.000 |

*FIG. 2C*

| Aspheric coefficients | | | | | | | |
|---|---|---|---|---|---|---|---|
| | 4th order | 6th order | 8th order | 10th order | 12th order | 14th order | 16th order |
| s3 | -4.45E+00 | -1.13E+01 | 3.50E+01 | 1.73E+02 | -4.25E+03 | -4.46E+04 | 2.07E+05 |
| s4 | -3.01E+00 | -9.51E-01 | -6.14E+01 | -5.06E+02 | -4.31E+03 | -2.33E+04 | 3.61E+05 |
| s7 | 4.39E+00 | -6.02E+01 | -1.34E+02 | 1.76E+04 | 1.29E+06 | 1.92E+07 | -7.89E+08 |
| s8 | -9.11E-01 | 8.74E+00 | 3.45E+01 | -1.76E+03 | -2.36E+04 | 7.45E+05 | -3.87E+06 |
| s11 | 3.21E+01 | 1.59E+00 | 5.68E-01 | -3.72E+01 | -8.26E+01 | 1.65E+01 | 4.54E+03 |

*FIG. 2D*

WIDE-ANGLE OPTICAL LENS SYSTEM

BACKGROUND OF THE INVENTION

1. Field of the Invention

The present invention generally relates to an optical system, and more particularly to a wide-angle wafer-level optical lens system.

2. Description of Related Art

Wafer level optics is a technique of fabricating miniaturized optics such as lens module or camera module at the wafer level using semiconductor techniques with the advantages of reduced form factor and reflowability. The wafer level optics is well adapted to mobile or handheld devices, to which photograph has become an indispensable function.

An eye tracker is a device for measuring eye positions and eye movement by using eye tracking technique, which is the process of measuring either the point of gaze or the motion of an eye relative to the head. The eye tracker demands wide-angle lens with large field of view (FOV).

A need has thus arisen to propose a novel array lens with large field of view (FOV) adaptable to wide-angle lens applications such as eye-tracking devices.

SUMMARY OF THE INVENTION

In view of the foregoing, it is an object of the embodiment of the present invention to provide a wide-angle optical lens system capable of reaching a large field of view (FOV) without sacrificing modulation transfer function (MTF) and distortion.

According to one embodiment, a wide-angle optical lens system includes a negative-powered first lens group, a positive-powered second lens group and a positive-powered third lens group arranged in an order from an object side to an image side.

Specifically, the negative-powered first lens group includes a flat first substrate and a concave first lens arranged in the order from the object side to the image side. The positive-powered second lens group includes a convex second lens, a flat second substrate and a convex third lens arranged in the order from the object side to the image side. In one embodiment, positive-powered third lens group includes a concave fourth lens, a flat third substrate and a convex fifth lens arranged in the order from the object side to the image side. In another embodiment, the positive-powered third lens group includes a convex fourth lens, a flat third substrate and a convex fifth lens arranged in the order from the object side to the image side.

BRIEF DESCRIPTION OF THE DRAWINGS

FIG. 1C and FIG. 1D show data tables of the wide-angle optical lens system of FIG. 1A with respect to an incident light with wavelength of 850 nm according to one exemplary embodiment of the present invention;

FIG. 2C and FIG. 2D show data tables of the wide-angle optical lens system of FIG. 2A with respect to an incident light with wavelength of 850 nm according to one exemplary embodiment of the present invention.

DETAILED DESCRIPTION OF THE INVENTION

Figure 1A:
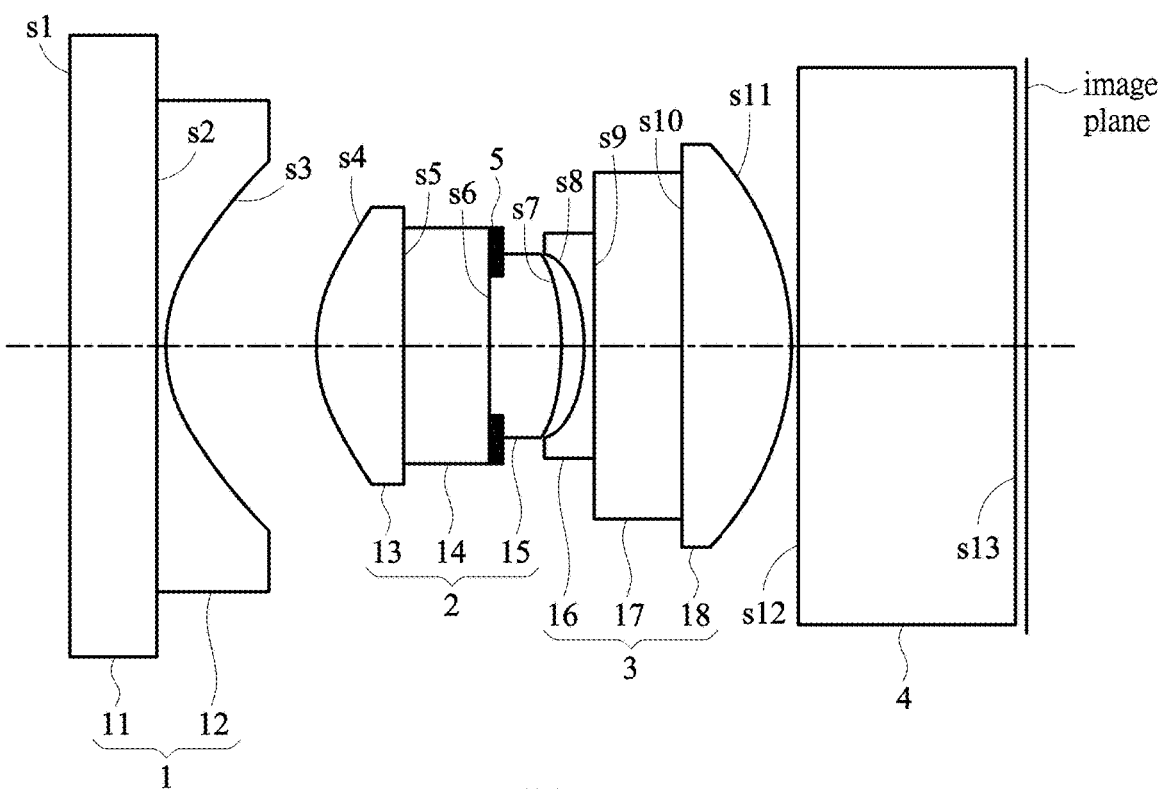
FIG. 1A shows a lens arrangement of a wide-angle optical lens system according to one embodiment of the present invention.
Figure 1B:
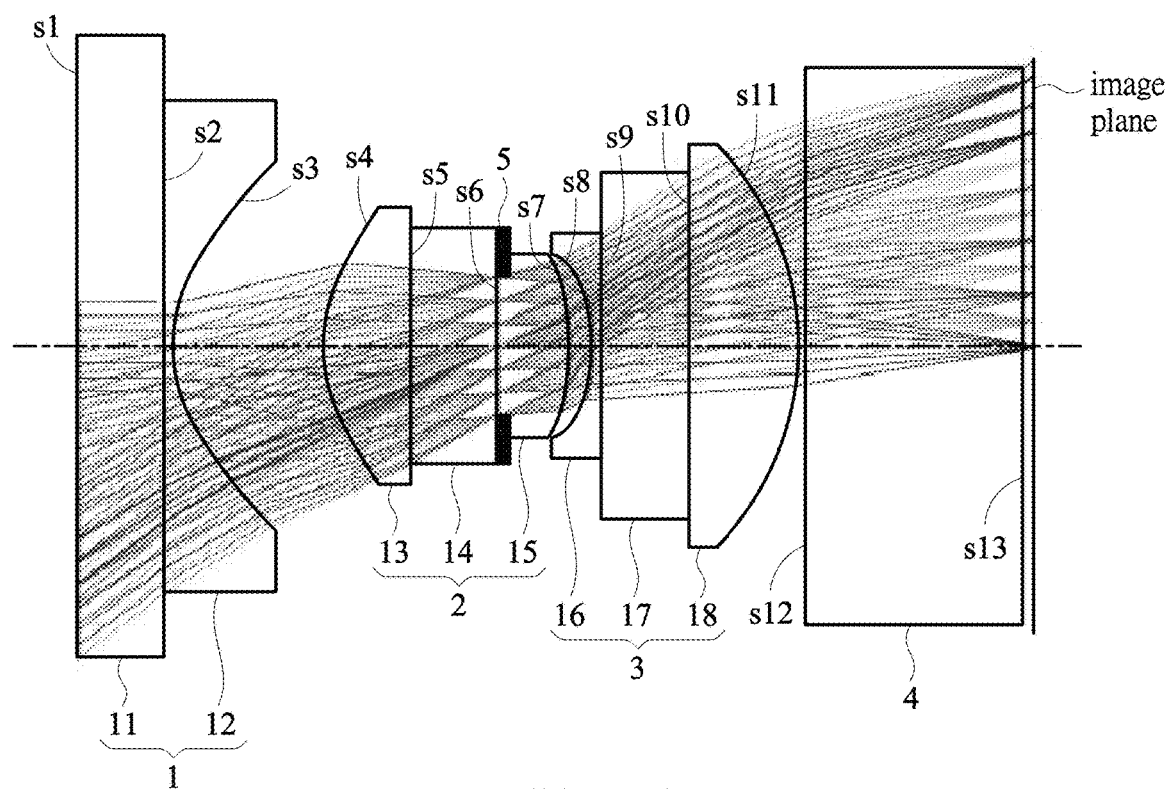
FIG. 1B shows an exemplary ray diagram of FIG. 1A.

FIG. 1A shows a lens arrangement of a wide-angle optical lens system 100 according to one embodiment of the present invention, and FIG. 1B shows an exemplary ray diagram of FIG. 1A. The wide-angle optical lens system 100 of the embodiment may be adapted, for example, to a camera module of an eye tracker for measuring either the point of gaze or the motion of an eye relative to the head.

The wide-angle optical lens system 100 of the embodiment may be preferably fabricated by wafer-level optics (WLO) technique, which is a technique of fabricating miniaturized optics such as lens module or camera module at the wafer level using semiconductor techniques with the advantages of reducing form factor and being reflowable. The wide-angle optical lens system 100 of the embodiment may be composed of a transparent material such as glass or plastic. In the drawings, the left side (or object side) of the wide-angle optical lens system 100 faces an object, and the right side (or image side) of the wide-angle optical lens system 100 faces an image plane (or sense plane) of a sensor (not shown).

In the embodiment, the wide-angle optical lens system 100 may include, in the order from the object side to the image side, a negative-powered first lens group 1 (that is, a lens group with negative refractive power), a positive-powered second lens group 2 (that is, a lens group with positive refractive power) and a positive-powered third lens group 3. The wide-angle optical lens system 100 of the embodiment may optionally include a cover glass 4 disposed between the positive-powered third lens group 3 and the image plane of the sensor (not shown).

Specifically, the negative-powered first lens group 1 may include, in the order from the object side to the image side, a flat first substrate 11 (e.g., glass substrate) and a concave first lens 12. To be more specific, the flat first substrate 11 may have a planar object-side surface s1 and a planar image-side surface s2. The concave first lens 12 may have a planer object-side surface s2 and a concave image-side surface s3. In the embodiment, the flat first substrate 11 is in substantially contact with the concave first lens 12.

The positive-powered second lens group 2 may include, in the order from the object side to the image side, a convex second lens 13, a flat second substrate 14 and a convex third lens 15. To be more specific, the convex second lens 13 may have a convex object-side surface s4 and a planar image-side surface s5. The flat second substrate 14 may have a planar object-side surface s5 and a planar image-side surface s6. The convex third lens 15 may have a planar object-side surface s6 and a convex image-side surface s7. In the embodiment, the convex second lens 13 is in substantially contact with the flat second substrate 14, which is further in substantially contact with the convex third lens 15. In the embodiment, an aperture (or stop) 5 may be disposed between the flat second substrate 14 and the convex third lens 15.

The positive-powered third lens group 3 may include, in the order from the object side to the image side, a concave fourth lens 16, a flat third substrate 17 and a convex fifth lens 18. To be more specific, the concave fourth lens 16 may have a concave object-side surface s8 and a planar image-side surface s9. The flat third substrate 17 may have a planar object-side surface s9 and a planar image-side surface s10. The convex fifth lens 18 may have a planar object-side surface s10 and a convex image-side surface s1l. The cover glass 4 may have a planar object-side surface s12 and a planar image-side surface s13. In the embodiment, the concave fourth lens 16 is in substantially contact with the flat third substrate 17, which is further in substantially contact with the convex fifth lens 18.

FIG. 1C and FIG. 1D show data tables of the wide-angle optical lens system 100 of FIG. 1A with respect to an incident light with wavelength of 850 nm (nanometer) according to one exemplary embodiment of the present invention. In the embodiment, the total length between the planar object-side surface s1 and the image plane is less than 2.2 mm (millimeter) (preferably about 2.198 mm), the cover glass 4 is about 500 um (micrometer), object distance (from the object to the planar object-side surface s1 of the flat first substrate 11) is about 23 mm, and wavelength of a (monochromatic) incident light is between 850 nm (nanometer) and 940 nm (preferably about 850 nm). According to the embodiment, effective focal length (EFL) is between 0.38 mm and 0.5 mm (preferably about 0.467 mm), and field of view (FOV) is about 122° (degree). The first lens 12 to the fifth lens 18 have a refractive index of 1.5-1.75 (preferably about 1.7), and the first substrate 11 to the third substrate 17 (e.g., glass substrate) have a refractive index of 1.5-1.6 (preferably about 1.503). Accordingly, without sacrificing modulation transfer function (MTF) and distortion, the wide-angle optical lens system 100 of the embodiment can reach the field of view (FOV) of 122°. Compared to conventional optical systems, particularly optical systems composed of plastic lenses, the wide-angle optical lens system 100 of the embodiment has fewer lenses and reduced total length.

The aspheric surface (e.g., s3, s4, s7, s8 or s11) may be defined by the following equation:

$$z = \frac{cr^2}{1 + \sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where z is a distance from a vertex of lens in an optical axis direction, r is a distance in the direction perpendicular to the optical axis, c is a reciprocal of radius of curvature on vertex of lens, k is a conic constant and a1 to as are aspheric coefficients.

Figure 1E:
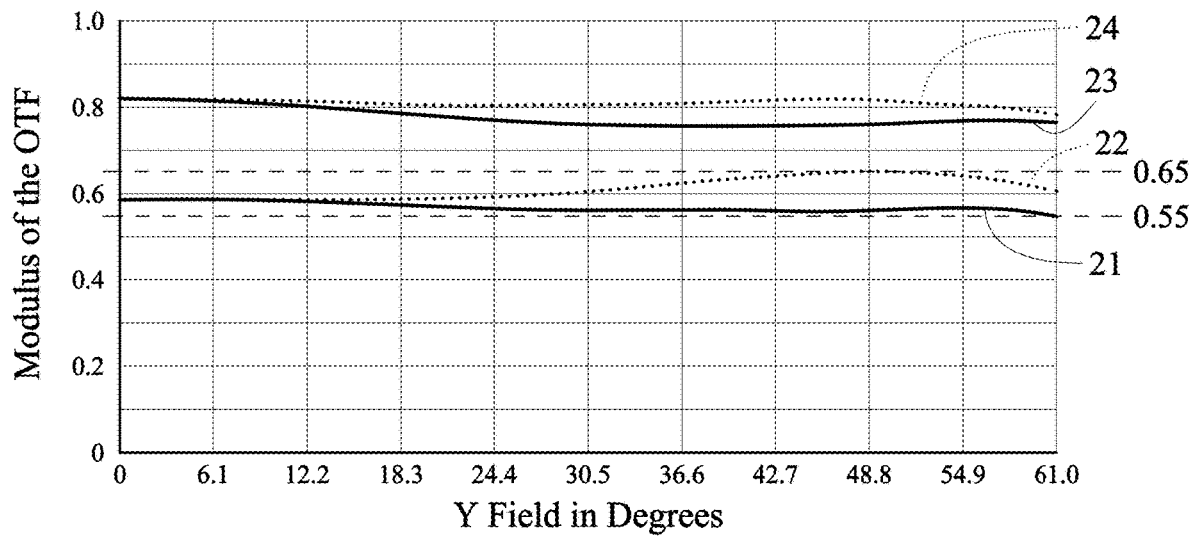
FIG. 1E and FIG. 1F show exemplary MTF and distortion respectively of the wide-angle optical lens system of FIG. 1A according to the embodiment of the present invention.
Figure 1F:
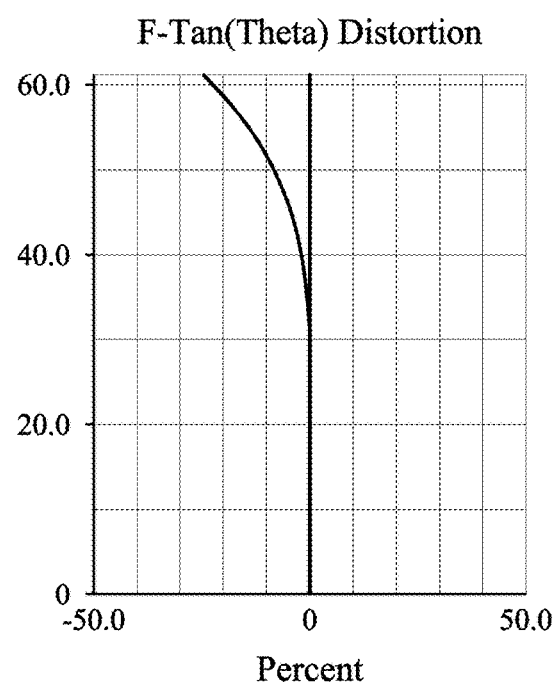

FIG. 1E and FIG. 1F show exemplary MTF and distortion respectively of the wide-angle optical lens system 100 of FIG. 1A according to the embodiment as described above. Specifically, the MTFs with half the Nyquist frequency of 227.28 lp/mm (line pair per millimeter) in the T direction and the S direction are greater than 0.55 as denoted by 21 and 22 respectively in FIG. 1E, the MTFs with quarter of the Nyquist frequency of 227.28 lp/mm in the T direction and the S direction are greater than 0.65 as denoted by 23 and 24 respectively in FIG. 1E, and the distortion is less than 25% as shown in FIG. 1F.

Figure 2A:
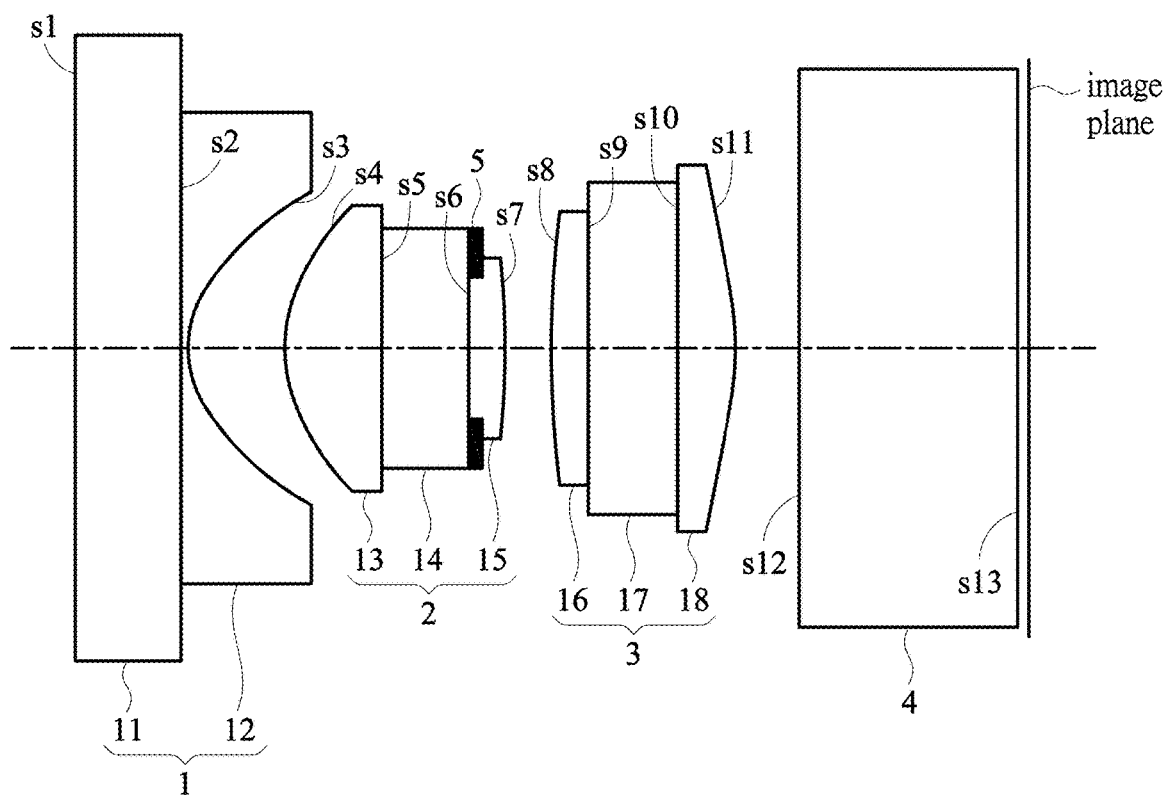
FIG. 2A shows a lens arrangement of a wide-angle optical lens system according to another embodiment of the present invention.
Figure 2B:
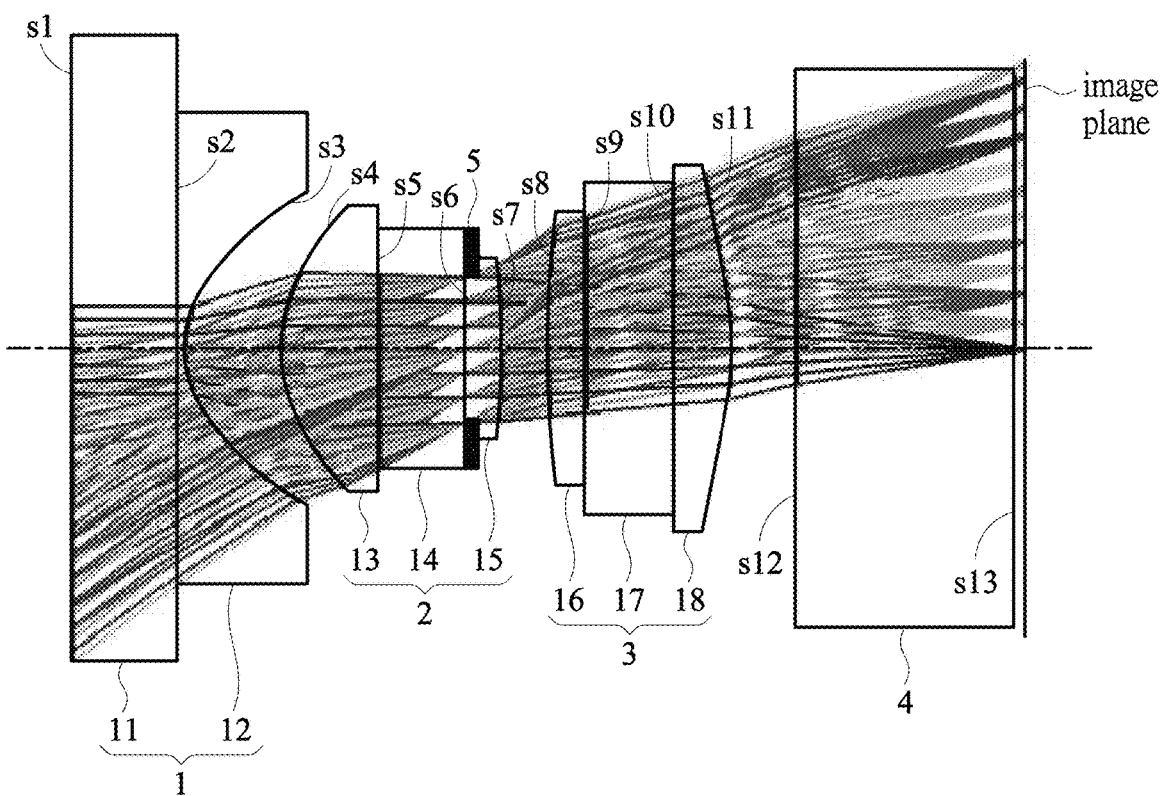
FIG. 2B shows an exemplary ray diagram of FIG. 2A.

FIG. 2A shows a lens arrangement of a wide-angle optical lens system 200 according to another embodiment of the present invention, and FIG. 2B shows an exemplary ray diagram of FIG. 2A.

In the embodiment, the wide-angle optical lens system 200 may include, in the order from the object side to the image side, a negative-powered first lens group 1, a positive-powered second lens group 2 and a positive-powered third lens group 3. The wide-angle optical lens system 200 of the embodiment may optionally include a cover glass 4 disposed between the positive-powered third lens group 3 and the image plane of the sensor (not shown).

Specifically, the negative-powered first lens group 1 may include, in the order from the object side to the image side, a flat first substrate 11 (e.g., glass substrate) and a concave first lens 12. To be more specific, the flat first substrate 11 may have a planar object-side surface s1 and a planar image-side surface s2. The concave first lens 12 may have a planer object-side surface s2 and a concave image-side surface s3. In the embodiment, the flat first substrate 11 is in substantially contact with the concave first lens 12.

The positive-powered second lens group 2 may include, in the order from the object side to the image side, a convex second lens 13, a flat second substrate 14 and a convex third lens 15. To be more specific, the convex second lens 13 may have a convex object-side surface s4 and a planar image-side surface s5. The flat second substrate 14 may have a planar object-side surface s5 and a planar image-side surface s6. The convex third lens 15 may have a planar object-side surface s6 and a convex image-side surface s7. In the embodiment, the convex second lens 13 is in substantially contact with the flat second substrate 14, which is further in substantially contact with the convex third lens 15. In the embodiment, an aperture (or stop) 5 may be disposed between the flat second substrate 14 and the convex third lens 15.

The positive-powered third lens group 3 may include, in the order from the object side to the image side, a convex fourth lens 16, a flat third substrate 17 and a convex fifth lens 18. To be more specific, the convex fourth lens 16 may have a convex object-side surface s8 and a planar image-side surface s9. The flat third substrate 17 may have a planar object-side surface s9 and a planar image-side surface s10. The convex fifth lens 18 may have a planar object-side surface s10 and a convex image-side surface s11. The cover glass 4 may have a planar object-side surface s12 and a planar image-side surface s13. In the embodiment, the convex fourth lens 16 is in substantially contact with the flat third substrate 17, which is further in substantially contact with the convex fifth lens 18.

FIG. 2C and FIG. 2D show data tables of the wide-angle optical lens system 200 of FIG. 2A with respect to an incident light with wavelength of 850 nm according to one exemplary embodiment of the present invention. In the embodiment, the total length between the planar object-side surface s1 and the image plane is less than 2.2 mm (millimeter) (preferably about 2.19 mm), the cover glass 4 is about 500 um (micrometer), object distance is about 23 mm, and wavelength of a (monochromatic) incident light is between 850 nm (nanometer) and 940 nm (preferably about 850 nm). According to the embodiment, effective focal length (EFL) is between 0.38 mm and 0.5 mm (preferably about 0.454 mm), and field of view (FOV) is about 122° (degree). The first lens 12 to the fifth lens 18 have a refractive index of 1.5-1.75 (preferably 1.596), and the first substrate 11 to the third substrate 17 (e.g., glass substrate) have a refractive index of 1.5-1.6 (preferably 1.503). Accordingly, without sacrificing modulation transfer function (MTF) and distortion, the wide-angle optical lens system 200 of the embodiment can reach the field of view (FOV) of 122°. Compared to conventional optical systems, particularly optical systems composed of plastic lenses, the wide-angle optical lens system 200 of the embodiment has fewer lenses and reduced total length.

Figure 2E:
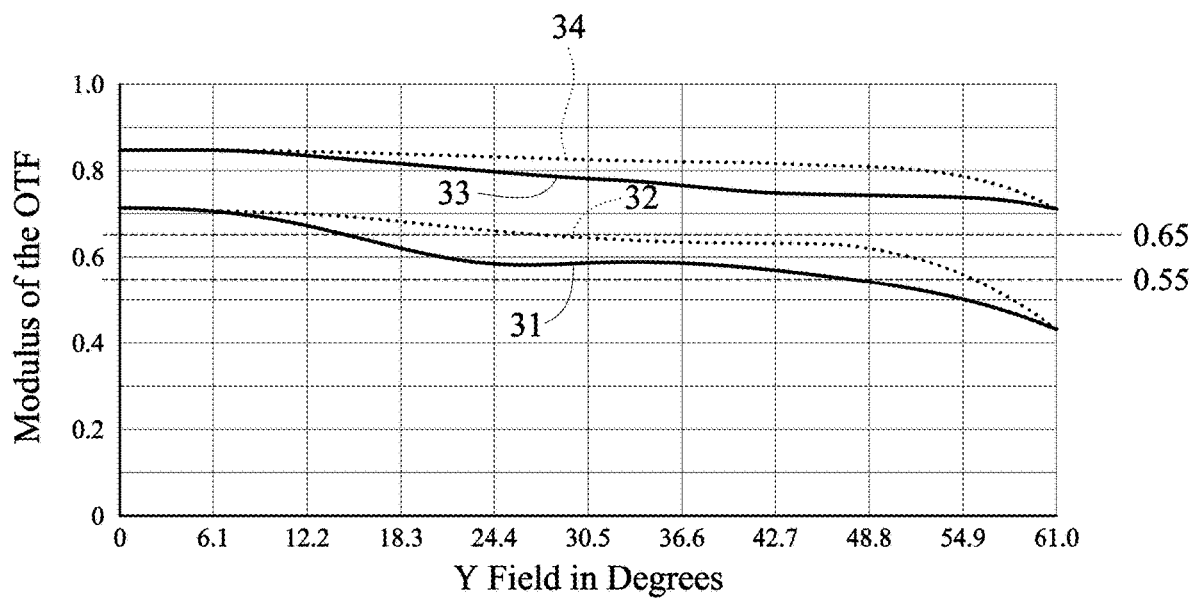
FIG. 2E and FIG. 2F show exemplary MTF and distortion respectively of the wide-angle optical lens system of FIG. 2A according to the embodiment of the present invention.
Figure 2F:
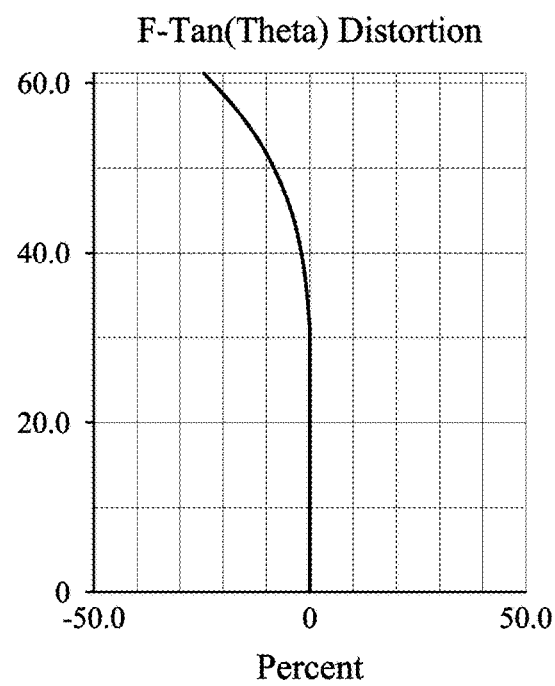

FIG. 2E and FIG. 2F show exemplary MTF and distortion respectively of the wide-angle optical lens system 200 of FIG. 2A according to the embodiment as described above. Specifically, the MTFs in 0-0.77 field with half the Nyquist frequency of 227.28 lp/mm (line pair per millimeter) in the T direction and the S direction are greater than 0.55 as denoted by 31 and 32 respectively in FIG. 2E, the MTFs with quarter of the Nyquist frequency of 227.28 lp/mm in the T direction and the S direction are greater than 0.65 as denoted by 33 and 34 respectively in FIG. 2E, and the distortion is less than 25% as shown in FIG. 2F.

Although specific embodiments have been illustrated and described, it will be appreciated by those skilled in the art that various modifications may be made without departing from the scope of the present invention, which is intended to be limited solely by the appended claims.

What is claimed is:

1. A wide-angle optical lens system, comprising:
a negative-powered first lens group;
a positive-powered second lens group; and
a positive-powered third lens group;
wherein the negative-powered first lens group, the positive-powered second lens group and the positive-powered third lens group are arranged in an order from an object side to an image side;
wherein the positive-powered third lens group comprises a concave fourth lens, a flat third substrate and a convex fifth lens arranged in the order from the object side to the image side.

2. The system of claim 1, wherein the negative-powered first lens group comprises a flat first substrate and a concave first lens arranged in the order from the object side to the image side.

3. The system of claim 2, wherein the concave first lens has a refractive index of 1.5-1.75 and the flat first substrate has a refractive index of 1.5-1.6.

4. The system of claim 2, wherein the flat first substrate has a planar object-side surface and a planar image-side surface; and the concave first lens has a planer object-side surface and a concave image-side surface.

5. The system of claim 2, wherein the flat first substrate is in substantially contact with the concave first lens.

6. The system of claim 1, wherein the positive-powered second lens group comprises a convex second lens, a flat second substrate and a convex third lens arranged in the order from the object side to the image side.

7. The system of claim 6, wherein the convex second lens and the convex third lens have a refractive index of 1.5-1.75 and the flat second substrate has a refractive index of 1.5-1.6.

8. The system of claim 6, further comprising:
an aperture disposed between the flat second substrate and the convex third lens.

9. The system of claim 6, wherein the convex second lens has a convex object-side surface and a planar image-side surface; the flat second substrate has a planar object-side surface and a planar image-side surface; and the convex third lens has a planar object-side surface and a convex image-side surface.

10. The system of claim 6, wherein the convex second lens is in substantially contact with the flat second substrate, which is further in substantially contact with the convex third lens.

11. The system of claim 1, wherein the concave fourth lens and the convex fifth lens have a refractive index of 1.5-1.75 and the flat third substrate has a refractive index of 1.5-1.6.

12. The system of claim 1, wherein the concave fourth lens has a concave object-side surface and a planar image-side surface; the flat third substrate has a planar object-side surface and a planar image-side surface; and the convex fifth lens has a planar object-side surface and a convex image-side surface.

13. The system of claim 1, wherein the concave fourth lens is in substantially contact with the flat third substrate, which is further in substantially contact with the convex fifth lens.

14. The system of claim 1, wherein the negative-powered first lens group, the positive-powered second lens group and the positive-powered third lens group are fabricated by wafer-level optics (WLO) technique.

15. The system of claim 1, further comprising:
a cover glass disposed between the positive-powered third lens group and an image plane of a sensor facing the positive-powered third lens group;
wherein a total length between the negative-powered first lens group and the image plane is less than 2.2 millimeter (mm).

* * * * *